(12) United States Patent
Anderson (10) Patent No.: US 11,662,213 B2
(45) Date of Patent: *May 30, 2023

(54) METHODS AND APPARATUS FOR ASSESSING COORDINATE DATA (71) Applicant: Deere & Company, Moline, IL (US)

(72) Inventor: Noel W. Anderson, Fargo, ND (US)

(73) Assignee: DEERE & COMPANY, Moline, IL (US)

(*) Notice: Subject to any disclaimer, the term of this patent is extended or adjusted under 35 U.S.C. 154(b) by 11 days.

This patent is subject to a terminal disclaimer.

(21) Appl. No.: 17/340,948

(22) Filed: Jun. 7, 2021

(65) Prior Publication Data

US 2021/0293553 A1   Sep. 23, 2021

Related U.S. Application Data

(63) Continuation of application No. 16/850,872, filed on Apr. 16, 2020, now Pat. No. 11,047,692, which is a continuation of application No. 15/861,340, filed on Jan. 3, 2018, now Pat. No. 10,648,820.

(51) Int. Cl.

| G01C 21/26 | (2006.01) |
| G01C 21/34 | (2006.01) |
| G08G 1/0968 | (2006.01) |
| G09B 29/10 | (2006.01) |

(Continued)

(52) U.S. Cl.
CPC ........ *G01C 21/3407* (2013.01); *A01B 69/008* (2013.01); *G01C 21/20* (2013.01); *G08G 1/096811* (2013.01); *G08G 1/096877* (2013.01); *G09B 29/106* (2013.01)

(58) Field of Classification Search
CPC ................ G01C 21/3415; G01C 21/20; G01C 21/3407; A01B 69/00
See application file for complete search history.

(56) References Cited

U.S. PATENT DOCUMENTS

| 9,081,917 B2 * | 7/2015 | Currin ..................... H04L 67/10 |
| 10,648,820 B2 | 5/2020 | Anderson |
| 11,047,692 B2 | 6/2021 | Anderson |

(Continued)

FOREIGN PATENT DOCUMENTS

JP        2017211892        11/2017

OTHER PUBLICATIONS

Dennis, "Space, Time, and Datum Forensics : Aligning GIS Data on a Dynamic Earth," retrieved from http://proceedings.esri.com/library/userconf/proc15/papers/935_537.pdf, Jul. 3, 2015, 35 pages.

(Continued)

*Primary Examiner* — Qutbuddin Ghulamali
(74) *Attorney, Agent, or Firm* — Hanley, Flight & Zimmerman, LLC (57) ABSTRACT

Methods and apparatus for assessing coordinate data are disclosed. An example apparatus includes a processor to receive coordinate data relating to a desired path and task of a vehicle. The processor of the example apparatus to determine if the coordinate data satisfies a threshold. The processor of the example apparatus to determine if the coordinate data is compatible with a positioning system of the vehicle. The processor of the example apparatus to authorize operation of the vehicle to traverse the desired path based on the coordinate data.

20 Claims, 7 Drawing Sheets

(51) Int. Cl.
 *A01B 69/04* (2006.01)
 *G01C 21/20* (2006.01)

(56) References Cited

U.S. PATENT DOCUMENTS

| | | | |
|---|---|---|---|
| 2014/0032035 A1* | 1/2014 | Thomson | G01C 21/206 |
| | | | 701/25 |
| 2014/0371979 A1* | 12/2014 | Drew | G01C 21/3407 |
| | | | 701/418 |
| 2015/0319913 A1* | 11/2015 | Foster | G05D 1/0217 |
| | | | 701/26 |
| 2016/0152263 A1 | 6/2016 | Singh et al. | |
| 2017/0160748 A1* | 6/2017 | Nakagawaa | G05D 1/00 |
| 2017/0177002 A1* | 6/2017 | Ogura | A01B 69/008 |
| 2018/0168093 A1* | 6/2018 | Matsuzaki | G05D 1/0287 |
| 2018/0178328 A1 | 6/2018 | Lalonde et al. | |
| 2018/0178382 A1* | 6/2018 | Lalonde | G05D 1/0297 |
| 2018/0325010 A1* | 11/2018 | Connell | A01B 69/004 |
| 2019/0244524 A1* | 8/2019 | Tanaka | G05D 1/0297 |
| 2020/0309543 A1* | 10/2020 | Voznesensky | G08G 1/096811 |

OTHER PUBLICATIONS

European Patent Office, "Extended Search Report," issued in connection with European Patent Application No. 18213133.4, dated May 28, 2019, 10 pages.
United States Patent and Trademark Office, "Non-Final Office Action," issued in connection with U.S. Appl. No. 15/861,340, dated Dec. 14, 2018, 6 pages.
United States Patent and Trademark Office, "Non-Final Office Action," issued in connection with U.S. Appl. No. 15/861,340, dated Jun. 13, 2019, 7 pages.
United States Patent and Trademark Office, "Notice of Allowance and Fee(s) Due," issued in connection with U.S. Appl. No. 15/861,340, dated Jan. 10, 2020, 8 pages.
United States Patent and Trademark Office, "Non-Final Office Action," issued in connection with U.S. Appl. No. 16/850,872, dated Oct. 16, 2020, 6 pages.
United States Patent and Trademark Office, "Notice of Allowance and Fee(s) Due," issued in connection with U.S. Appl. No. 16/850,872, dated Feb. 26, 2021, 9 pages.
European Patent Office, "Communication pursuant to Article 94(3) EPC," issued in connection with European Patent Application No. 18213133.4, dated Nov. 16, 2021, 7 pages.

* cited by examiner

METHODS AND APPARATUS FOR ASSESSING COORDINATE DATA

RELATED APPLICATIONS

This patent arises from a continuation of U.S. patent application Ser. No. 16/850,872, filed on Apr. 16, 2020, which is a continuation of U.S. patent application Ser. No. 15/861,340, filed on Jan. 3, 2018, now U.S. Pat. No. 10,648,820. U.S. patent application Ser. No. 16/850,872 and U.S. patent application Ser. No. 15/861,340 are hereby incorporated herein by reference in their entireties.

FIELD OF THE DISCLOSURE

This disclosure relates generally to machine guidance, and, more particularly, to methods and apparatus for assessing coordinate data.

BACKGROUND

To operate a work machine along a desired path, guidance systems combine map layers from various years to determine possible adjustments that need to be made to coordinate data in order for the work machine to properly traverse the desired path.

SUMMARY

An example apparatus includes a processor to receive coordinate data relating to a desired path and task of a vehicle. The processor of the example apparatus to determine if the coordinate data satisfies a threshold. The processor of the example apparatus to determine if the coordinate data is compatible with a positioning system of the vehicle. The processor of the example apparatus to authorize operation the vehicle to traverse the desired path based on the coordinate data.

An example method includes receiving, by executing an instruction with a processor, coordinate data relating to a desired path and task of a vehicle. The example method also includes determining, by executing an instruction with a processor, if the coordinate data satisfies a threshold. The example method also includes, determining, by executing an instruction with a processor, if the coordinate data is compatible with a positioning system of the vehicle. The example method also includes, authorizing, by executing an instruction with a processor, operation of the vehicle to traverse the desired path based on the coordinate data.

An example non-transitory computer-readable medium includes instructions that, when executed, cause a processor to, at least receive coordinate data relating to a desired path and task of a vehicle, determine if the coordinate data satisfies a threshold, determine if the coordinate data is compatible with a positioning system of the vehicle, and authorize operation of the vehicle to traverse the desired path based on the coordinate data.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Machine guidance to date has not attempted seed and nutrient placement, which requires precision and accuracy to be within 1 centimeter (cm). Other than coordinate format (e.g., decimal degrees vs minutes and seconds) and gross Coordinate Reference System (CRS) (e.g., WGS-84, NAD-83, UTM, etc.), there has been minimal advancement with regard to precise CRS consistency checking (e.g., WGS-84 datums and epochs) or other CRS attributes going into vehicle mission planning and archival data recording. Failure to check consistency between the CRS and accuracy used by a vehicle positioning system and the CRS and accuracy of historical data can result in mission plans or field operations that kill crops by placing fertilizer too close to plants or by running a work machine over crops. Failure to check the consistency of the coordinate data can also result in reduced yields by placing fertilizer too far from plants or seed too far from previously applied fertilizer. In one example, for construction, topography data collected by an Unmanned Ariel Vehicle (UAV) may use a different CRS than a Global Navigation Satellite System (GNSS) receiver on a dozer which is moving material based on the UAV data. In another example, for turf care, a golf course green may have been mapped with a CRS different from the one being used by a greens mower for mower guidance. These examples are without limitation and extend the disclosed examples beyond agriculture.

Georeferenced field and worksite data has been available for over 20 years with the completion of the Global Positioning System (GPS) satellite constellation. GPS uses the WGS-84 coordinate system which has had 6 different realizations in its existence. During those 20 years, the central United States has experienced approximately 30-40 cm of continental drift relative to a static geocentric coordinate system. On an annual basis, continental drift across locations can range between 2 cm to 7 cm. Other areas have had several times that amount. As such, continental drift can make maps and GPS data that has not been updated error prone. Thus, continental drift needs to be considered in combining map layers and GPS data from heterogeneous sources (e.g., mixed brand farmer equipment, agricultural service providers, aerial image providers including UAVs, satellites, government and private ground surveys, etc.). In some examples, historical data, particularly before the advent of high precision corrected global navigation satellite systems such as Real-Time Kinematic (RTK) GPS, may have accuracy measured in meters vs. centimeters. Thus, differences may exist in two reported latitude, longitude, and altitudes of a given point (e.g., a survey marker) arising from differences in CRS, continental drift, and positioning sensor error, for example.

The examples disclosed herein solve the above mentioned problems by ensuring that the georeferenced data used in guiding an implement through a field, or other vehicle on a worksite, uses coordinate data that is consistent to a level supporting the placement or operation precision (e.g., within 0-10 cm). As used herein, the term "coordinate data" comprises a coordinate reference system, a coordinate format, a realization, an epoch, a time of measurement, map layers, previous mission plans, positioning sensor accuracy, and a plate drift offset.

The examples disclosed herein provide an apparatus to receive coordinate data relating to a desired path and task of a vehicle. For example, the apparatus may receive coordinate data for a path of travel the vehicle is to traverse or a mission plan that includes instructions for a work machine. In some examples, the mission plan may include coordinate data along with instructions to operate certain components of the work machine at various locations along the desired path.

When the coordinate data and/or the mission plan is received, the apparatus determines if the coordinate data satisfies a threshold. To maintain precision and accuracy of the work machine, the threshold is within 0-10 centimeters of the desired path. In some examples, failure to meet the threshold may result from an integrity check indicating that the coordinate reference systems are not compatible with the positioning system on a work machine. In other examples, the CRS of the mission and the vehicle may be identical, but the accuracy of measurements in historic data used to generate the mission may be insufficient for the current mission. A specific threshold may be based on a precision or accuracy required by the particular mission and in some examples may come from a need to accurately guide the work machine or a component thereof to deposit a material, remove a material, or avoid an object or zone by a given distance. In some examples, the task element of a mission does not add to following a planned path, i.e., it is a "null" task. In other examples, the machine is guided by a human operator, but the mission tasks are automated to a georeferenced plan. In still other examples, the mission comprises both an automated plan to move the work machine and for automated georeferenced actions to be taken along the path including, without limitation, collecting data, depositing material, moving or leveling material, removing material, and conditioning or processing material. Without limitation, material may comprise soil, rock, sand, seed, chemicals, and/or organic matter.

In the examples disclosed herein, integrity checking may mean that the coordinate data and/or mission plan was generated by a trusted source that has already taken care of CRS consistency and has included a certificate to that effect. In some examples, a list of coordinate data from map layers used to generate the mission plan may be included along with transformations used to normalize the layers. In this example, the apparatus checks this data and transform pedigree to ensure the data satisfies the threshold. In some examples, the precision and accuracy of the data source (e.g., a Global Navigation Satellite System (GNSS) sensor) for each map layer are also considered. In some examples, accuracy of the coordinate data transforms is considered. For example, if the data was transformed from NAD-83 to WGS-84, the apparatus determines that the resulting coordinate data from that transformations is accurate. Other integrity checks may also be employed in addition to the ones detailed above.

The apparatus determines if the coordinate data is compatible with a positioning system of the vehicle. For example, the coordinate data may be in the form of NAD-83, and the apparatus determines that the NAD-83 format of the coordinate data is compatible with the positioning system of the vehicle. In some examples, the coordinate data may be in the NAD-83 CRS, but the positioning system of the vehicle is only compatible with the current WGS-84 CRS. In such an example, the apparatus determines if a transformation exists to transform the NAD-83 coordinate data into current WGS-84 coordinate data. If a transformation exists, the apparatus transforms the coordinate data into a compatible form for the positioning system of the vehicle.

The apparatus authorizes operation of the vehicle to traverse the desired path based on the coordinate data. However, if the coordinate data does not satisfy the threshold and/or is not compatible with the positioning system of the vehicle, the apparatus inhibits operation of the vehicle. For example, the apparatus may disable actuators of the vehicle.

Figure 1:
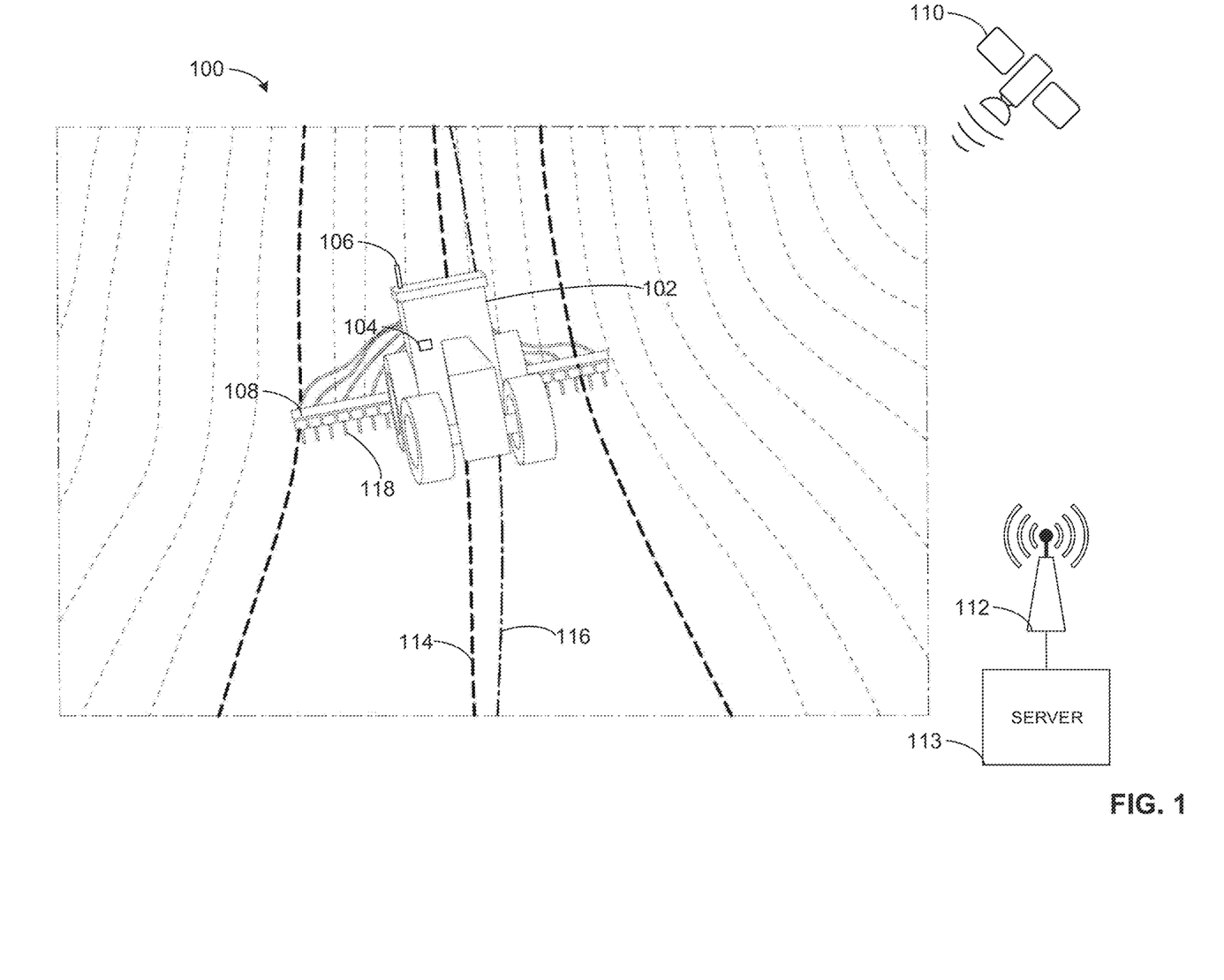
FIG. 1 represents an example environment in which the apparatus and methods disclosed herein may be implemented.

FIG. 1 represents an example environment 100 in which the apparatus and methods disclosed herein may be implemented. The example environment 100 includes an example work machine 102, which includes an example processor 104, an example GNSS sensor 106, and an example tool head 108. The example environment 100 also includes an example satellite 110, an example base station 112, and an example server 113.

In the illustrated example, the work machine 102 is executing a mission plan. The mission plan identified a target path for the work machine 102 to traverse, illustrated by line 114. However, the actual path of the work machine 102 is illustrated by line 116. Prior to operating the work machine 102, the processor 104 analyzes the mission plan to determine if the coordinate data of the mission plan satisfies a threshold. For example, the processor 104 receives the mission plan and determines that coordinate data of the mission plan is up to date and is accurate within a certain range (e.g., 1 cm, 5 cm, 10 cm, etc.). As such, the processor 104 initiates operation of the work machine 102 to traverse the target path 114. During operation of the work machine 102, updated GPS data is received from the satellite 110 and the base station 112. In the examples disclosed herein, the satellite 104 may be any type of satellite such as a Global Positioning System (GPS) satellite, a Satellite-Based Augmentation System (SBAS) satellite, or Global Navigation Satellite System (GLONASS) satellite, for example. The base station 112 of the illustrated example may be any type of base station such as Real Time Kinematic (RTK) base station, or a Precise Point Positioning (PPP) base station, for example.

Alternatively, the server 113 may analyze the mission plan to determine if the coordinate data of the mission plan satisfies a threshold. For example, the server 113 may receive the mission plan and determine that coordinate data of the mission plan is up to date and is accurate within a certain range (e.g., 1 cm, 5 cm, 10 cm, etc.). As such, the server 113 may then send the mission plan to the processor 104 to initiate operation of the work machine 102 to traverse the target path 114.

The GNSS sensor 106 receives the GPS data from the satellite 110 and may receive corrected and/or updated GPS data from the base station 112. For example, the satellite 110 may send GPS data to the GNSS sensor 106 and the base station 112 that is accurate up to 10 cm, and the base station 112 may send corrected GPS data to the GNSS sensor 106 that is accurate up to 1 cm so that the actual path 116 of the work machine 102 is as close to the target path 114 as possible. Additionally, the example GNSS sensor 106 may send signals to the base station 112 to increase the accuracy of the GPS data.

In some examples, the example tool head 108 may increase and/or decrease the spacing between work pieces 118 or inhibit application of fertilizer based on data received from a mission plan. Alternatively, the tool head 108 may operate the work pieces 118 if the processor 104 determines that the work machine 102 is off the target path 114. For example, the tool head 108 may move the work pieces 118 to offset the distance between the actual path 116 and the target path 114.

Figure 2:
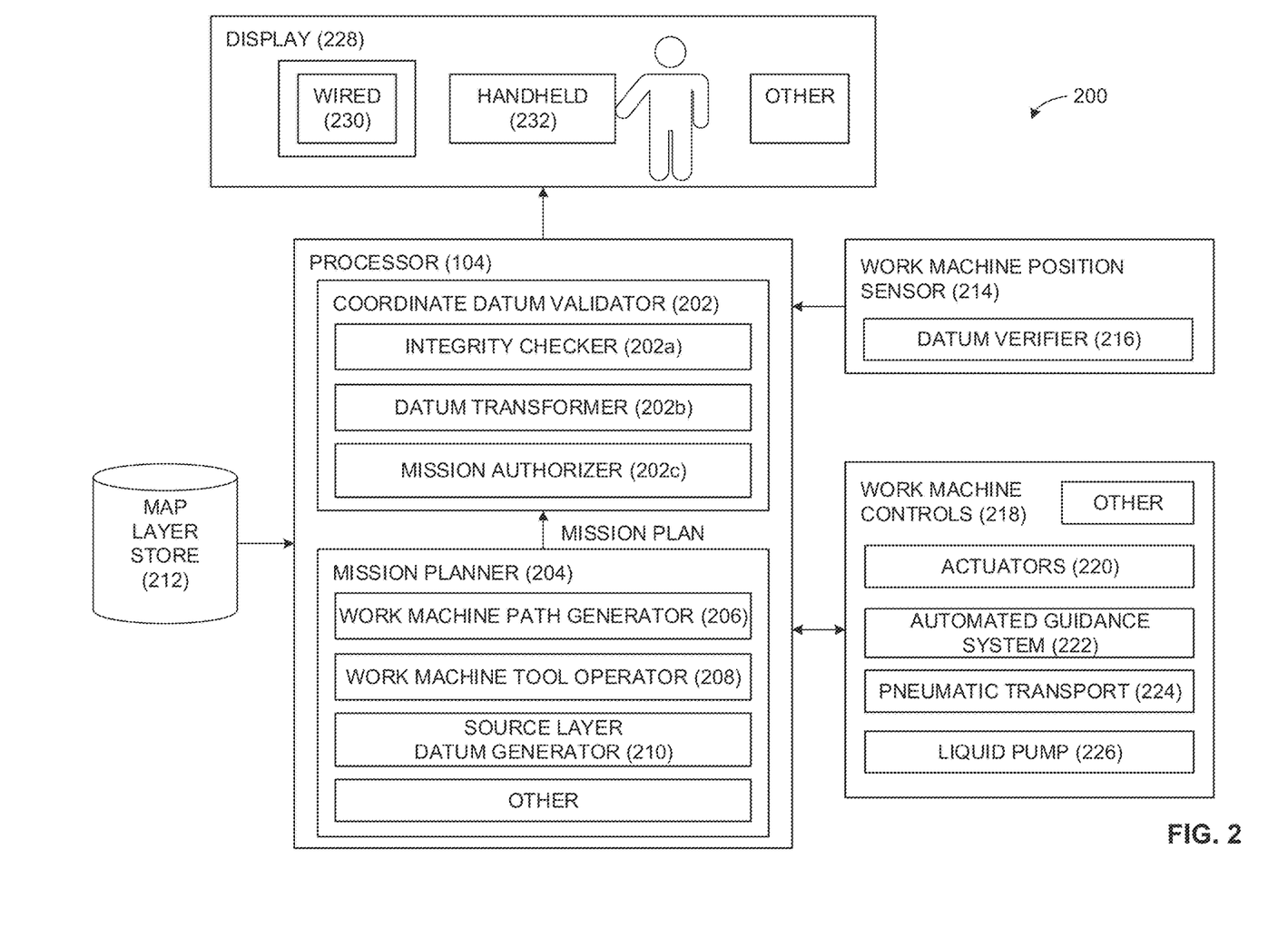
FIG. 2 is a diagram of an apparatus that may be used to implement the example methods described herein.

FIG. 2 is a diagram of an apparatus 200 that may be used to implement the example methods disclosed herein. The example apparatus 200 includes the processor 104, which includes an example coordinate datum validator 202 and an example mission planner 204. The example coordinate datum validator 202 includes an integrity checker 202a, a datum transformer 202b, and a mission authorizer 202c. The example mission planner 204 includes a work machine path generator 206, work machine tool operator 208, source layer datum generator 210. The example apparatus 200 also includes a map layer store 212, a work machine position sensor 214 that includes a datum verifier 216, work machine controls 218 that includes actuators 220, an automated guidance system 222, a pneumatic transport 224, and a liquid pump 226. The example apparatus 200 also includes a display 228 that may be wired 230 or handheld 232.

In the illustrated example, the processor 104 receives worksite map layers from the map layer store 212. The map layer store 212 may contain map layers that are either georeferenced and/or non-georeferenced. Additionally, the map layer store 212 may contain map layers of paths that the work machine 102 has previously traversed. The example mission planner 204 may receive these map layers and prepare a mission plan. The example work machine path generator 206 may generate a path the work machine 102 is to traverse based on the map layers received from the map layer store 212. For example, the work machine path generator 206 may generate a path that traverses the entire field so the work machine 102 may plant seeds. The example work machine tool operator 208 may determine a rate at which nutrients are to be placed in the field. For example, the work machine tool operator 208 may determine a rate at which the work machine 102 is to plant the seeds in the field when it is traversing the path generated by the work machine path generator 206. Additionally, the work machine tool operator 208 may determine when to operate the work machine controls 218. The example source layer datum generator 210 may generate a new map layer based on new mission plan and/or check the accuracy of the map layers received from the map layer store 212 to determine if there are any map layers currently in the source layer datum generator 210 that are more accurate. Additionally, the source layer datum generator 210 may keep track of any transformations that may have occurred to the map layers. In some examples, the source layer datum generator 210 may transform coordinate data to another format such as from degree-minute-second to decimal degrees. In other examples, the source layer datum generator 210 may transform coordinate data from a version or realization of NAD-83 to the current WGS-84 version or realization.

The mission planner 204 may also receive GPS data from the work machine position sensor 214. In some examples, the datum verifier 216 may check received GPS data to ensure that it is compatible with the work machine 102. Additionally or alternatively, the datum verifier 216 may perform a transformation so that received GPS data is in a compatible format for the work machine 102. While the example datum verifier 216 is shown in the example work machine position sensor 214, the datum verifier 216 may be included in the processor 104 or the mission planner 204. In some examples, the work machine position sensor 214 is the GNSS sensor 106 of FIG. 1.

Once the mission plan has been generated by the mission planner 204, the coordinate datum validator 202 determines if the coordinate data in the mission plan is precise and accurate (e.g., within a desired range). In some examples, the integrity checker 202a may perform an integrity check on the mission plan. For example, the integrity checker 202a may determine if a certificate is included in the mission plan, indicating that the mission was generated by a trusted source which has already taken care of datum consistency. In another example, the integrity checker 202a may analyze a list of datums from map layers used to generate the mission from the source layer datum generator 210 along with transformations used to normalize the map layers. In some examples, the integrity checker 202a checks the precision and accuracy of a data source (e.g., a GNSS sensor) for each map layer. The precision may be related to the number of binary digits used to represent spatial data in, for example, latitudes and longitudes. It may also be related to the representation of data types in transformation computations. For example, while one precision may be satisfactory for representing latitude and longitude, another representation having more precision may be needed for intermediate results of transformation calculations. A transform may be certified to maintain a given precision and/or accuracy. The accuracy may be related to the type of correction applied by the work machine position sensor 214 to a raw positions, such as Differential Correction, Wide Area Augmentation System (WAAS), and/or Real-Time Kinematic (RTK). Accuracy may also be related to operational factors such as the satellite constellation used in measuring positions as represented by, for example, Dilution of Precision (DOP).

In some examples, the coordinate datum validator 202 may determine the accuracy and compatibility of the datum transforms performed by the datum verifier 216 and/or the source layer datum generator 210. For example, the datum transformer 202b may determine if the datum transforms are precise and accurate, and compatible with the work machine 102. If the datum transforms are not precise and accurate and/or not compatible with the work machine 102, the datum transformer 202b may perform a transformation so that received coordinate data is in a compatible format for the work machine 102. Alternatively, the datum transformer 202b may transform coordinate data in the mission plan to another format. For example, the datum transformer 202b may transform coordinate data from NAD-83 to WGS-84.

If the coordinate datum validator 202 determines that the mission plan is precise and accurate, and compatible with the work machine 102, the mission authorizer 202c authorizes operation of the work machine controls 218 to execute the mission plan. For example, the processor 104 may send instructions to the work machine controls 218 to operate the actuators 220 to operate a tillage tool, the automated guidance system 222 for a tractor, the pneumatic transport 224 for a planter or seeder, and/or the liquid pump for a fertilizer mission.

If the coordinate datum validator 202 determines that the mission plan is not precise and accurate, and/or not compatible with the work machine 102, the mission authorizer 202c inhibits operation of the work machine controls 218 and sends an error message to the display 228 for display to an operator of the work machine 102. For example, the processor 104 may send an error message to the wired 230 display of the work machine 102 to alert an operator that the mission plan is not satisfactory. Alternatively, the processor 104 may send the error message to the handheld 232 display when the work machine 102 is an autonomous vehicle. In another example, the error message is sent simultaneously to the wired display 230 for an operator to see or hear and to a handheld display 232 belonging to a supervisor.

While an example manner of implementing the processor 104 of FIG. 1 is illustrated in FIG. 2, one or more of the elements, processes and/or devices illustrated in FIG. 2 may be combined, divided, re-arranged, omitted, eliminated and/or implemented in any other way. Further, the example coordinate datum validator 202, the example integrity checker 202a, the example datum transformer 202b, the example mission authorizer 202c, the example mission planner 204, the example work machine path generator 206, the example work machine tool operator 208, the example source layer datum generator 210, the example datum verifier 216, and/or, more generally, the example apparatus 200 of FIG. 2 may be implemented by hardware, software, firmware and/or any combination of hardware, software and/or firmware. Thus, for example, any of the example coordinate datum validator 202, the example integrity checker 202a, the example datum transformer 202b, the example mission authorizer 202c, the example mission planner 204, the example work machine path generator 206, the example work machine tool operator 208, the example source layer datum generator 210, the example datum verifier 216, and/or, more generally, the example apparatus 200 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example coordinate datum validator 202, the example integrity checker 202a, the example datum transformer 202b, the example mission authorizer 202c, the example mission planner 204, the example work machine path generator 206, the example work machine tool operator 208, the example source layer datum generator 210, the example datum verifier 216, and/or, more generally, the example apparatus 200 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example apparatus 200 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic or machine readable instructions for implementing the apparatus 200 of FIG. 2 are shown in FIGS. 3-6. The machine readable instructions may be a program or portion of a program for execution by a processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 3-6, many other methods of implementing the example apparatus 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

Figure 3:
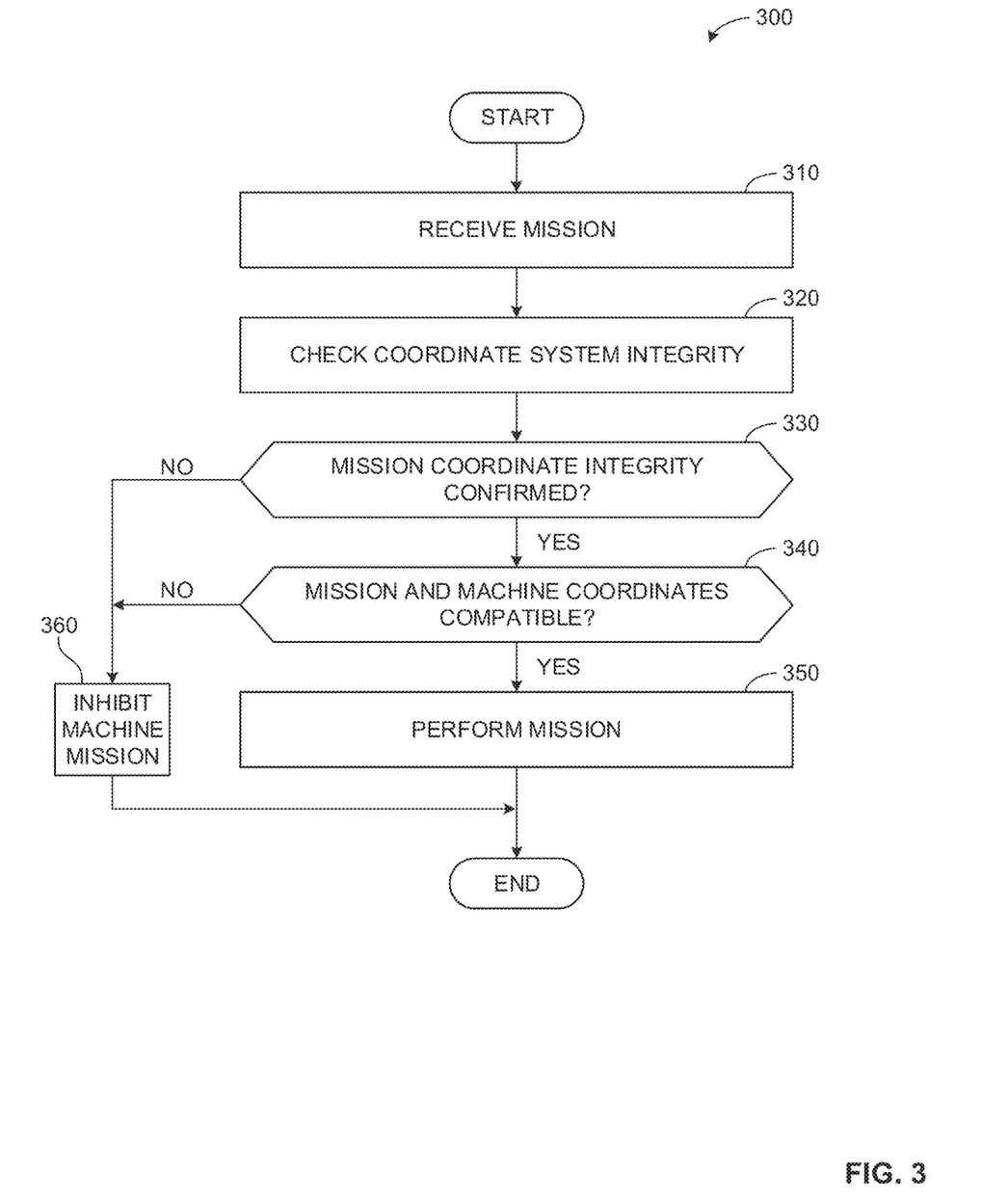
FIGS. 3-6 are example flowcharts representative of the example methods implemented by the apparatus described herein.

The program 300 of FIG. 3 begins when the coordinate datum validator 202 receives the mission plan from the mission planner 204 (block 310). The integrity checker 202a then checks the coordinate system integrity (block 320). For example, the integrity checker 202a may determine if the coordinate data in the mission plan includes a certificate indicating that the coordinate data has been checked for consistency by a trusted source. It is then determined if the mission coordinate integrity was confirmed (block 330). For example, the integrity checker 202a determines if there is a certificate. If the mission coordinate integrity is not confirmed, the mission authorizer 202c inhibits the machine mission (block 360). However, if the integrity checker 202a confirms the mission coordinate integrity, the process proceeds to block 340 to determine if the mission and machine coordinates are compatible. For example, the datum transformer 202b determines if the coordinate data is in a compatible format with the work machine 102, or if there is a transformation that exists to transform the coordinate data into a compatible format. In another example, the integrity checker 202a checks the datum of the mission with the datum used by the work machine 102. If the mission and machine coordinates are not compatible, the mission authorizer 202c inhibits the machine mission at block 360. If the mission and machine coordinates are compatible, the work machine 102 performs the mission (block 350). The process 300 ends.

Figure 4:
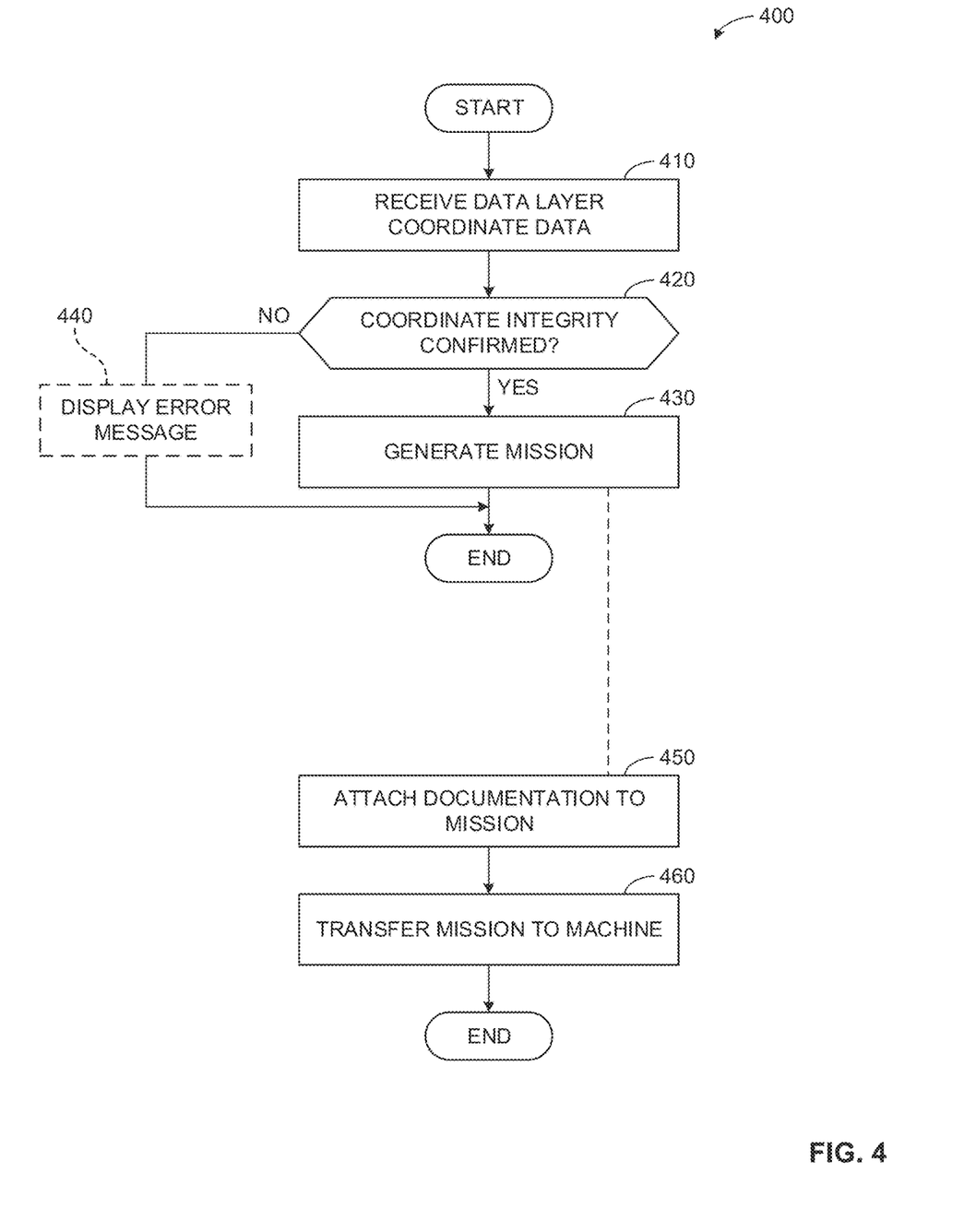

The program 400 illustrates an example process that may take place at a back office instead of the work machine 102, for example. The program 400 begins when the mission planner 204 receives data layer coordinate data (block 410). For example, the program begins when the mission planner 204 receives map layer data from the map layer store 212. It is then determined if the coordinate integrity is confirmed (block 420). For example, the integrity checker 202a determines if the coordinate data is precise and accurate (e.g., within a certain range). If the coordinate integrity is confirmed, the mission planner 204 generates a mission (block 430). If the coordinate integrity is not confirmed, the mission authorizer 202c instructs the display of an error message (block 440). For example, the processor 104 may send an error message to a handheld 232 display of an operator generating the mission. The program 400 ends. In some examples, the program 400 may include an additional step of attaching documentation to the mission (block 450). For example, the documentation may be a certificate indicating that a trusted source checked the coordinate data for consistency. The processor 104 then transfers the mission to the work machine 102 (block 460). The program 400 ends.

Figure 5:
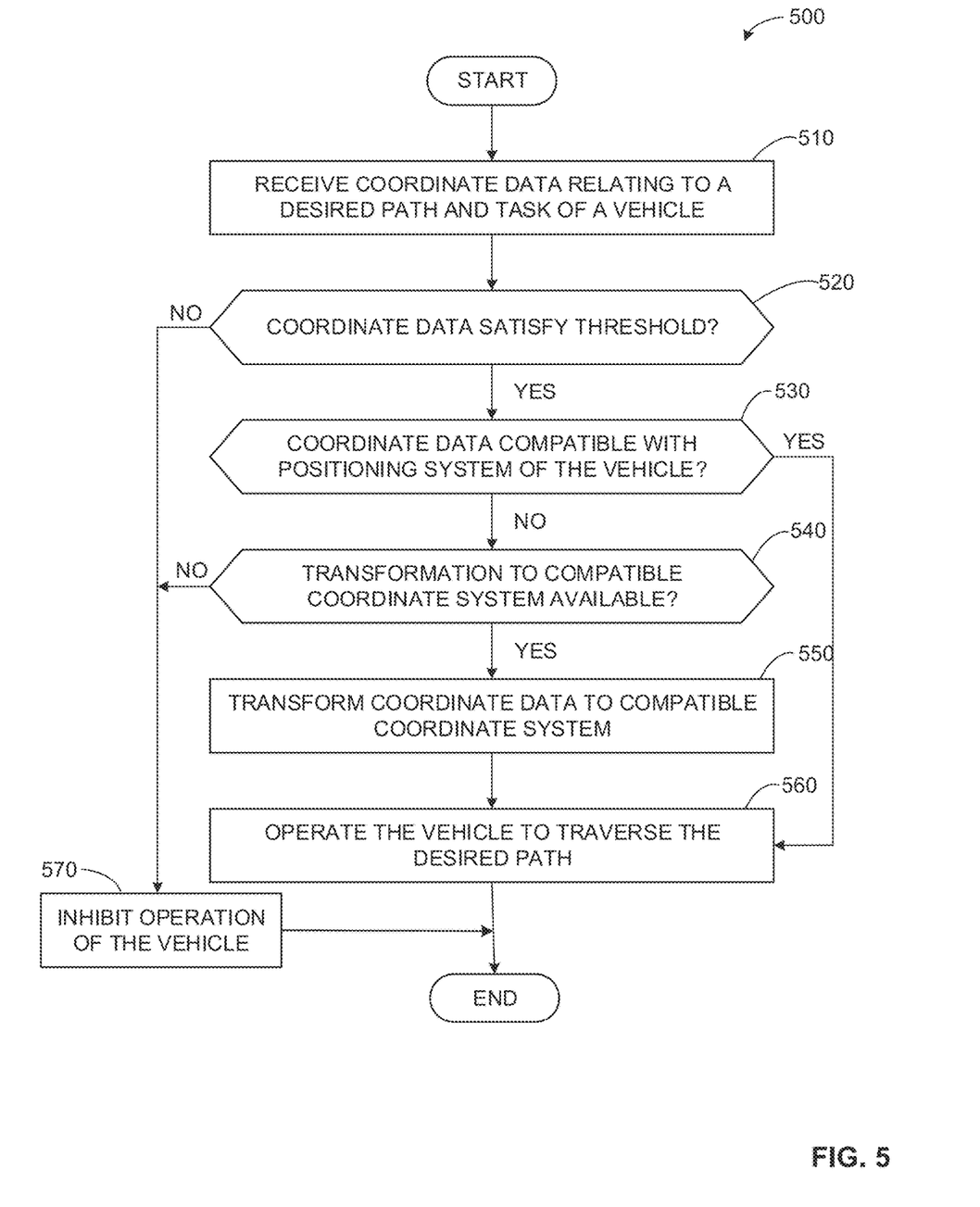

The program 500 begins when the processor 104 receives coordinate data relating to a desired path and/or task of a vehicle (block 510). The integrity checker 202a determines if the coordinate data satisfies a threshold (block 520). For example, the integrity checker 202a determines if the coordinate data is precise and accurate and performs an integrity check for CRS. In some examples, the threshold comprises both a threshold for accuracy and an integrity for CRS. In another example, the integrity checker 202a may determine if the coordinate data satisfies a mission accuracy threshold relating to data and transforms, and a mission integrity check relating to CRS. If the coordinate data does not satisfy the threshold, the mission authorizer 202c inhibits operation of the vehicle (block 570). If the coordinate data does satisfy the threshold, it is then determined if the coordinate data is compatible with the positioning system of the vehicle (block 530). For example, the datum transformer 202b determines if the coordinate data is compatible with the work machine 102. If the coordinate data is compatible with the positioning system of the vehicle, the mission authorizer 202c operates the vehicle to traverse the desired path (block 560). For example, the mission authorizer 202c authorizes the operation of the work machine 102. If the coordinate data is not compatible with the positioning system of the vehicle, it is determined if a transformation is available to transform the coordinate data to a compatible coordinate system (block 540). If no transformation is available, the mission authorizer 202c inhibits operation of the vehicle (block 570). If a transformation is available, the datum transformer 202b transforms the coordinate data to a compatible coordinate system (block 550). The mission authorizer 202c then operates the vehicle to traverse the desired path (block 560). For example, the mission authorizer 202c authorizes the operation of the work machine 102. The program 500 ends.

Figure 6:
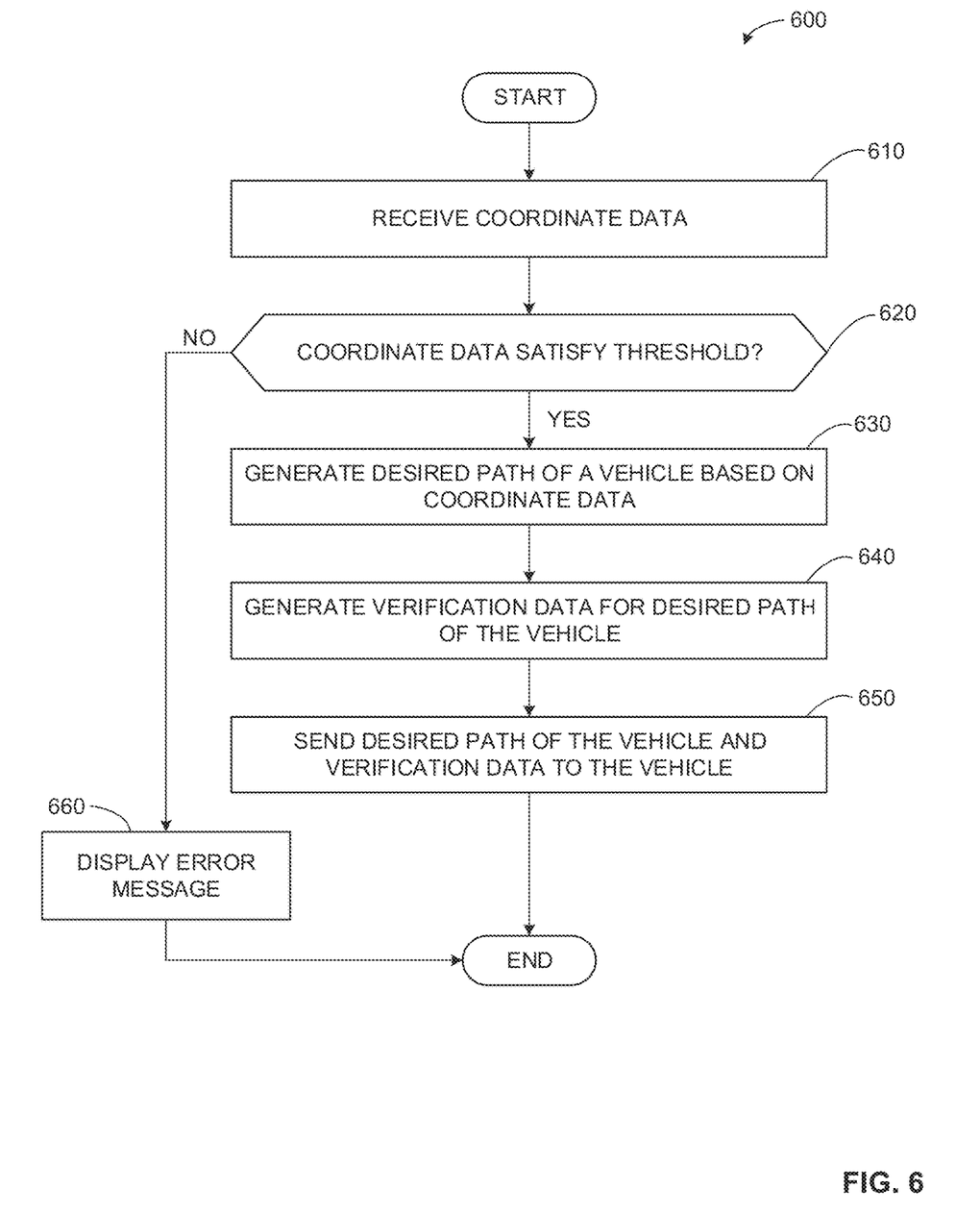

The program 600 begins when the processor 104 receives coordinate data (block 610). The integrity checker 202a, determines if the coordinate data satisfies a threshold (block 620). For example, the integrity checker 202a determines if the coordinate data is precise and accurate and performs an integrity check for CRS. If the coordinate data does not satisfy the threshold, the mission authorizer 202c displays an error message (block 660). For example, the mission authorizer 202c sends an error message for display. If the coordinate data satisfies the threshold, the work machine path generator 206 generates a desired path of a vehicle, or component thereof, based on the coordinate data (block 630). The source layer datum generator 210 then generates verification data for the desired path of the vehicle (block 640). The processor 104 then sends the desired path of the vehicle and the verification data to the vehicle (block 650). The program 600 ends.

Figure 7:
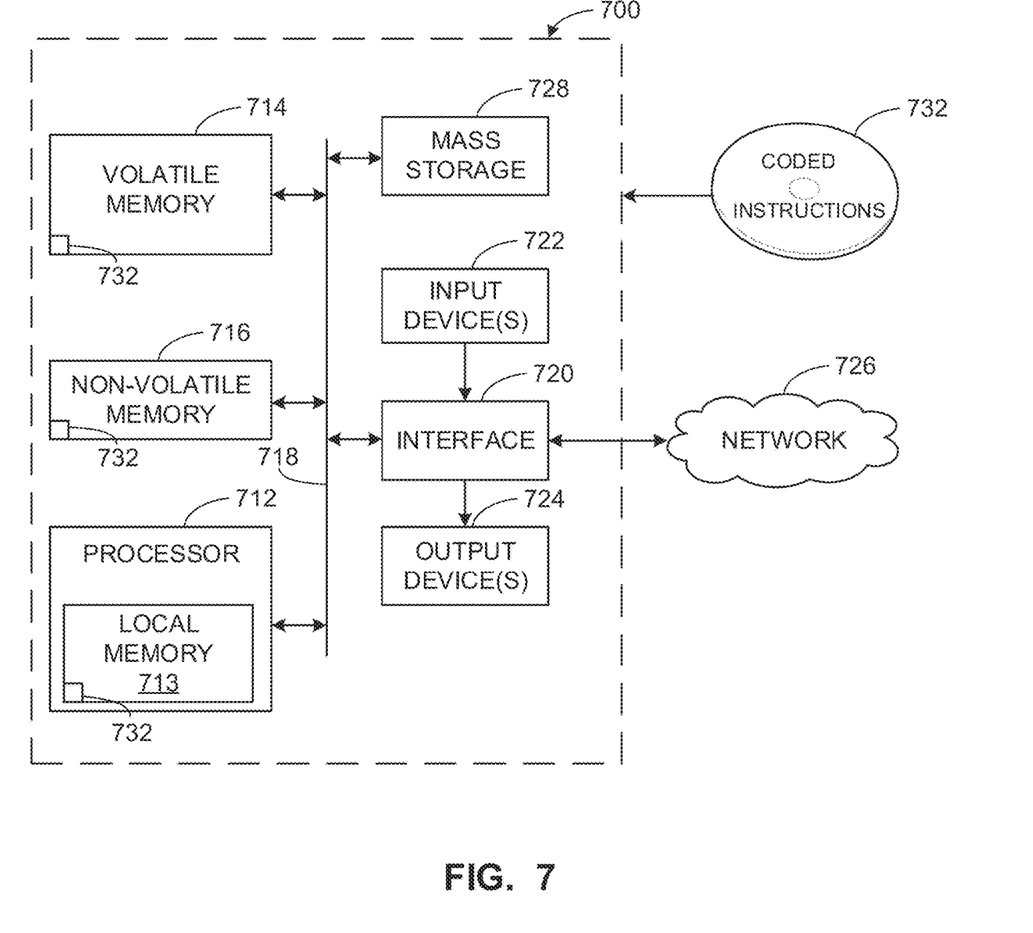
FIG. 7 is an example processor platform that may be used with the example apparatus of FIG. 2 and/or the example methods of FIGS. 3-6.

FIG. 7 is a block diagram of an example processor platform 700 structured to execute the instructions of FIGS. 3-6 to implement the apparatus 200 of FIG. 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the processor 104 and/or the apparatus 200.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 300, 400, 500, and 600 of FIGS. 3-6 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that assess coordinate data. The examples disclosed herein provide an accurate and safe way to evaluate the increasing number of data received from various sources. The examples disclosed herein provide accuracy within a range of 0-10 cm. This beneficial because known coordinate data for on-highway vehicles is implemented with a tolerance of up to 30 feet. Using that type of coordinate data for agricultural purposes would destroy crops. Additionally, the examples disclosed herein maintain the accuracy of transformed coordinate data so that it may be utilized with other work machines.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   memory; and
   a processor to:
   receive coordinate data relating to a worksite;
   determine if the coordinate data satisfies an integrity threshold;
   generate a mission plan for a vehicle to perform a desired task based on the coordinate data;
   generate verification data for the mission plan; and
   transmit the mission plan and the verification data to a server, the server to authorize operation of the vehicle to perform the desired task.

2. The apparatus of claim 1, wherein the processor is to inhibit the operation of the vehicle in response to the coordinate data not satisfying the integrity threshold.

3. The apparatus of claim 2, wherein inhibiting the operation of the vehicle includes disabling operation of actuators of the vehicle.

4. The apparatus of claim 1, wherein the integrity threshold is based on at least one of a certification, a pedigree of the coordinate data, or a position sensor accuracy.

5. The apparatus of claim 4, wherein the processor is to verify the position sensor accuracy by verifying accuracy of a measurement from a Global Navigation Satellite System sensor.

6. The apparatus of claim 1, wherein the processor is to adjust the coordinate data in response to the coordinate data not being compatible with a positioning system of the vehicle.

7. The apparatus of claim 6, wherein adjusting the coordinate data includes transforming the coordinate data to a coordinate system compatible with the positioning system.

8. A method comprising:
   receiving, by executing instructions with a processor, coordinate data relating to a worksite;
   determining, by executing the instructions with the processor, whether the coordinate data satisfies an integrity threshold;
   generating, by executing the instructions with the processor, a mission plan for a vehicle to perform a desired task based on the coordinate data;
   generating, by executing the instructions with the processor, verification data for the mission plan; and
   transmitting, by executing the instructions with the processor, the mission plan and the verification data to a server, the server to authorize operation of the vehicle to perform the desired task.

9. The method of claim 8, further including inhibiting, by executing the instructions with the processor, the operation of the vehicle in response to the coordinate data not satisfying the integrity threshold.

10. The method of claim 9, wherein inhibiting the operation of the vehicle includes disabling, by executing the instructions with the processor, operation of actuators of the vehicle.

11. The method of claim 8, wherein the integrity threshold is based on at least one of a certification, a pedigree of the coordinate data, or a position sensor accuracy.

12. The method of claim 11, further including verifying, by executing the instructions with the processor, the position sensor accuracy by verifying accuracy of a measurement from a Global Navigation Satellite System sensor.

13. The method of claim 8, further including adjusting, by executing the instructions with the processor, the coordinate data in response to the coordinate data not being compatible with a positioning system of the vehicle.

14. The method of claim 13, wherein adjusting the coordinate data includes transforming, by executing the instructions with the processor, the coordinate data to a coordinate system compatible with the positioning system.

15. A non-transitory computer readable medium comprising instructions that, when executed, cause a processor to at least:
   receive coordinate data relating to a worksite;
   determine if the coordinate data satisfies an integrity threshold;
   generate a mission plan for a vehicle to perform a desired task based on the coordinate data;
   generate verification data for the mission plan; and
   transmit the mission plan and the verification data to a server, the server to authorize operation of the vehicle to perform the desired task.

16. The non-transitory computer readable medium of claim 15, wherein the instructions, when executed, further cause the processor to inhibit, in response to the coordinate data not satisfying the integrity threshold, the operation of the vehicle by disabling operation of actuators of the vehicle.

17. The non-transitory computer readable medium of claim 15, wherein the integrity threshold is based on at least one of a certification, a pedigree of the coordinate data, or a position sensor accuracy.

18. The non-transitory computer readable medium of claim 17, wherein the instructions, when executed, further cause the processor to verify the position sensor accuracy by verifying accuracy of a measurement from a Global Navigation Satellite System sensor.

19. The non-transitory computer readable medium of claim 15, wherein the instructions, when executed, further cause the processor to adjust the coordinate data in response to the coordinate data not being compatible with a positioning system of the vehicle.

20. The non-transitory computer readable medium of claim 19, wherein the instructions, when executed, further cause the processor to transform the coordinate data to a coordinate system compatible with the positioning system.

* * * * *